US010926876B2

(12) United States Patent
Kozak

(10) Patent No.: US 10,926,876 B2
(45) Date of Patent: Feb. 23, 2021

(54) TRAFFIC CONTROL SYSTEM, CONTROLLER AND METHOD FOR DIRECTING VEHICLE BEHAVIOR AT A DEFINED SPATIAL LOCATION

(71) Applicant: HERE GLOBAL B.V., Eindhoven (NL)

(72) Inventor: Frank Kozak, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 178 days.

(21) Appl. No.: 16/169,545

(22) Filed: Oct. 24, 2018

(65) Prior Publication Data
US 2020/0130826 A1    Apr. 30, 2020

(51) Int. Cl.
*B64C 39/02* (2006.01)
*G08G 1/09* (2006.01)
*G08G 1/052* (2006.01)

(52) U.S. Cl.
CPC ......... *B64C 39/024* (2013.01); *G08G 1/052* (2013.01); *G08G 1/09* (2013.01); *B64C 2201/12* (2013.01); *B64C 2201/141* (2013.01)

(58) Field of Classification Search
None
See application file for complete search history.

(56) References Cited

U.S. PATENT DOCUMENTS

| 9,070,289 | B2 | 6/2015 | Saund et al. |
| 9,387,928 | B1 | 7/2016 | Gentry et al. |
| 2014/0336848 | A1* | 11/2014 | Saund ............ G06T 7/215 701/3 |

(Continued)

FOREIGN PATENT DOCUMENTS

| CN | 206532423 U | 9/2017 |
| WO | WO 2018/022177 A1 | 2/2018 |

OTHER PUBLICATIONS

Souppouris, A., Renault Concept Car Launches Drone to Check for Gridlock Ahead [online] [retrieved Nov. 20, 2018]. Retrieved from the Internet: <URL: https://www.theverge.com/2014/2/7/5389114/renault-kwid-drone-care-concept>. (dated Feb. 7, 2014) 2 pages.

(Continued)

*Primary Examiner* — Dale W Hilgendorf
*Assistant Examiner* — Alexander C. Bost
(74) *Attorney, Agent, or Firm* — Alston & Bird LLP

(57) ABSTRACT

A traffic control system, a controller and an associated method are provided to direct a vehicle to slow or, in some instances, stop at a defined spatial location along the roadway. In the context of a controller, the controller includes at least one processor and memory including computer program code with the memory and the computer program code configured to, with the at least one processor, cause the controller to receive information indicative of at least one characteristic of the behavior of the vehicle as the vehicle approaches a defined location. Based on the information, the controller is caused to compare the behavior of the vehicle to a defined criterion and, in response, to cause an unmanned air vehicle (UAV) to maintain a hovering position in which the UAV hovers above the roadway so as to be within the path of travel of the vehicle on the roadway.

22 Claims, 8 Drawing Sheets

(56) References Cited

U.S. PATENT DOCUMENTS

| | | | |
|---|---|---|---|
| 2016/0325835 A1 | 11/2016 | Abuelsaad et al. | |
| 2016/0327645 A1* | 11/2016 | Nishimoto | G01S 13/92 |
| 2016/0379492 A1 | 12/2016 | Roy | |
| 2017/0301234 A1* | 10/2017 | Park | B64C 39/024 |
| 2018/0075759 A1* | 3/2018 | Kim | G08G 1/096827 |
| 2018/0188738 A1* | 7/2018 | Tatourian | G05D 1/0246 |
| 2018/0233038 A1* | 8/2018 | Kozloski | G08G 1/0175 |
| 2019/0051169 A1* | 2/2019 | Gomez Gutierrez | G08G 1/0965 |
| 2019/0197890 A1* | 6/2019 | Du | B64D 47/02 |
| 2019/0227555 A1* | 7/2019 | Sun | B64C 39/024 |
| 2019/0317530 A1* | 10/2019 | Yang | G05D 1/106 |
| 2020/0031468 A1* | 1/2020 | Neubecker | B64D 47/02 |

OTHER PUBLICATIONS

ID Students Win Again at NY International Auto Show Safety Competition [online] [retrieved Nov. 20, 2018]. Retrieved from the Internet: <URL: http://sasd.bridgeport.edu/id-students-win-again-at-ny-international-auto-show-safety-competition/> (dated Apr. 13, 2017) 4 pages.

\* cited by examiner

TRAFFIC CONTROL SYSTEM, CONTROLLER AND METHOD FOR DIRECTING VEHICLE BEHAVIOR AT A DEFINED SPATIAL LOCATION

TECHNOLOGICAL FIELD

A traffic control system, a controller and an associated method are provided for directing vehicle behavior and, more particularly, for directing a vehicle to slow or stop at a defined spatial location.

BACKGROUND

A wide variety of mechanisms are utilized for traffic control in order to direct vehicle behavior and, more particularly, to direct vehicles to drive at particular speeds. For example, speed limits are posted on many roadways indicating the maximum and, in some instances, the minimum speeds that a vehicle can legally travel along the roadway. These posted speed limits may be enforced by various law enforcement agencies in order to encourage drivers to obey the speed limits.

Additionally, traffic control features are employed at various spatial locations along the roadways at which a deviation from the posted speed limit is desired. For example, a railroad crossing may be marked by signage along the side of the road in advance of the railroad crossing as well as markings applied to the road surface. Similarly, pedestrian crosswalks, such as school crosswalks, may be designated by signage along the side of the road in advance of the crosswalk as well as markings on the roadway itself. The signage and other markings are intended to alert a driver as to a railroad crossing or a pedestrian crosswalk and to encourage the driver to stop his or her vehicle in an instance in which a train is approaching or crossing the roadway at the railroad crossing and/or and when pedestrians are crossing the roadway within the crosswalk.

Another traffic control feature is a speed bump, such as in the form of a raised and typically rounded ridge that extends laterally across a roadway, at a defined spatial location. Speed bumps may be formed along the roadway at locations at which vehicles may be tempted to or may have in the past driven at excessive speeds, such as along neighborhood roads, roads along which children may be playing or roads that may serve as a cut-through from one busy roadway to another busy roadway. A speed bump is intended to cause a vehicle to slow in order to permit the vehicle to pass over the speed bump in a controlled, comfortable manner. In contrast, a vehicle that passes over the speed bump at an excessive speed will jostle the driver and any passengers and may, in some instances, cause damage to the vehicle, thereby encouraging the driver to go more slowly over the speed bump in the future.

BRIEF SUMMARY

A traffic control system, a controller and an associated method are provided in accordance with an example embodiment in order to direct a vehicle to slow or, in some instances, stop at a defined spatial location along the roadway. The traffic control system, the controller and the associated method provide for traffic control in a manner that may increase driver adherence to the desired vehicle behavior and, as a result, may correspondingly provide increased safety for both pedestrians and drivers. Moreover, relative to speed bumps, a controller and an associated method of an example embodiment may not only direct the vehicle to slow at the defined spatial location, but may do so in a manner that avoids jostling the driver and any passengers so as to provide for a more comfortable ride, while also diminishing the likelihood that the vehicle will be damaged, particularly in an instance in which the driver adheres to the desired vehicle behavior.

In an example embodiment, a controller is provided that is configured to direct the vehicle to slow at a defined spatial location along a roadway. The controller includes at least one processor and memory including computer program code with the memory and the computer program code configured to, with the at least one processor, cause the controller to receive information indicative of at least one characteristic of the behavior of the vehicle as the vehicle approaches a defined location. Based on the information, the controller is caused to compare the behavior of the vehicle to a defined criterion and, in response, to cause an unmanned air vehicle (UAV) to maintain a hovering position in which the UAV hovers above the roadway so as to be within the path of travel of the vehicle on the roadway.

In an embodiment in which the information is indicative of the speed of the vehicle, the controller is configured to compare the behavior of the vehicle to the defined criterion by determining whether the speed of the vehicle is less than a defined speed. The controller of this example embodiment is configured to cause the UAV to maintain the hovering position within the path of travel of the vehicle in response to determining that the speed of the vehicle is greater than the defined speed. However, the controller of this example embodiment is further configured to cause the UAV to fly out of the path of travel of the vehicle in response to determining that the speed of the vehicle is less than the defined speed. In another embodiment in which the information is indicative of a distance to the vehicle, the controller is configured to compare the behavior of the vehicle to the defined criterion by determining whether the distance to the vehicle is less than a defined distance. The controller of this example embodiment is configured to cause the UAV to maintain the hovering position within the path of travel of the vehicle in response to determining that the distance to the vehicle is greater than the defined distance. However, the controller of this example embodiment is further configured to cause the UAV to fly out of the path of travel of the vehicle in response to determining that the distance to the vehicle is less than the defined distance.

The controller of an example embodiment is also caused to cause an image of the vehicle to be captured. For example, in an embodiment in which the information is indicative of the speed of the vehicle, the controller is configured to cause the image to be captured in response to determining that the speed of the vehicle exceeds a determined threshold. The controller of another example embodiment is caused to cause the UAV to fly from a rest position to a hovering position in response to an indication that the vehicle is approaching the defined spatial location along the roadway. In this example embodiment, the controller is to cause the UAV to fly out of the path of travel of the vehicle and to return to the rest position in response to comparing the behavior of the vehicle to the defined criterion.

In another embodiment, a method is provided for directing a vehicle to slow at a defined spatial location along the roadway. The method includes receiving information indicative of at least one characteristic of the behavior of the vehicle as the vehicle approaches the defined location. Based on the information, the method compares the behavior of the vehicle to a defined criterion and, in response, causes an unmanned air vehicle (UAV) to maintain a hovering position in which the UAV hovers above the roadway so as to be within a path of travel of the vehicle on the roadway.

In an embodiment in which the information is indicative of the speed of the vehicle, the method compares the behavior of the vehicle to the predefined criterion by determining whether the speed of the vehicle is less than the defined speed. The method of this example embodiment causes the UAV to maintain the hovering position within the path of travel of the vehicle in response to determining that the speed of the vehicle is greater than the defined speed. However, the method of this example embodiment causes the UAV to fly out of the path of travel of the vehicle in response to determining that the speed of the vehicle is less than the defined speed. In this example embodiment, the method may also determine whether the speed of the vehicle is less than a defined speed by determining whether the speed of the vehicle is less than the defined speed during a defined time period. The method of this embodiment then causes the UAV to maintain the hovering position within the path of travel of the vehicle in response to determining that the speed of the vehicle is greater than the defined speed within the defined time period.

In an embodiment in which the information is indicative of a distance to the vehicle, the method compares the behavior of the vehicle to the defined criterion by determining whether the distance to the vehicle is less than a defined distance. The method of this example embodiment causes the UAV to maintain the hovering position within the path of travel of the vehicle in response to determining that the distance to the vehicle is greater than the defined distance. However, the method of this example embodiment causes the UAV to fly out of the path of travel of the vehicle in response to determining that the distance to the vehicle is less than the defined distance.

The method of an example embodiment also includes causing an image of the vehicle to be captured in response to determining that the speed of the vehicle exceeds a determined threshold. The method of an example embodiment also includes causing the UAV to fly from a rest position to the hovering position in response to an indication that the vehicle is approaching the defined spatial location along the roadway. In this example embodiment, the method may further include recharging the UAV while the UAV is in the rest position.

In a further example embodiment, the traffic control system is provided that includes a controller configured to control operation of an unmanned air vehicle (UAV) at a defined spatial location along the roadway differently in response to first and second mutually exclusive conditions along the roadway. The controller is configured, in response to the first condition, to cause the UAV to hover above the roadway so as to be within a path of travel of the vehicle on the roadway. The controller is also configured, in response to the second condition, to cause the UAV to be positioned out of the path of travel of the vehicle on the roadway. The UAV is configured to remain at the defined spatial location and to be controlled by the controller so as to alternately respond to the first and second conditions along the roadway.

In an example embodiment, the first condition is associated with a train crossing the roadway and the second condition is indicative of an absence of the train from the roadway. In another embodiment, the first condition is associated with one or more people in a crosswalk across the roadway and the second condition is indicative of an absence of people from the crosswalk. In yet another embodiment, the first condition is associated with the vehicle approaching the defined spatial location along the roadway and the second condition is indicative of an absence of the vehicle from a proximity of the defined spatial location. The first and second conditions of an example embodiment are associated with the vehicle approaching the defined spatial location along the roadway at a speed that is greater than or less than a defined speed, respectively.

The UAV of an example embodiment includes a bumper formed of an elastomeric material and configured to physically contact the vehicle. The traffic control system of an example embodiment also includes an image capture system configured to capture an image of the vehicle in response to a determination that a speed of the vehicle exceeds a determined threshold. The traffic control system of an example embodiment also includes one or more sensors configured to detect at least one characteristic of the behavior of the vehicle as the vehicle approaches the defined spatial location along the roadway. The first and second conditions are based upon the at least one characteristic.

BRIEF DESCRIPTION OF THE DRAWINGS

Figure 1:
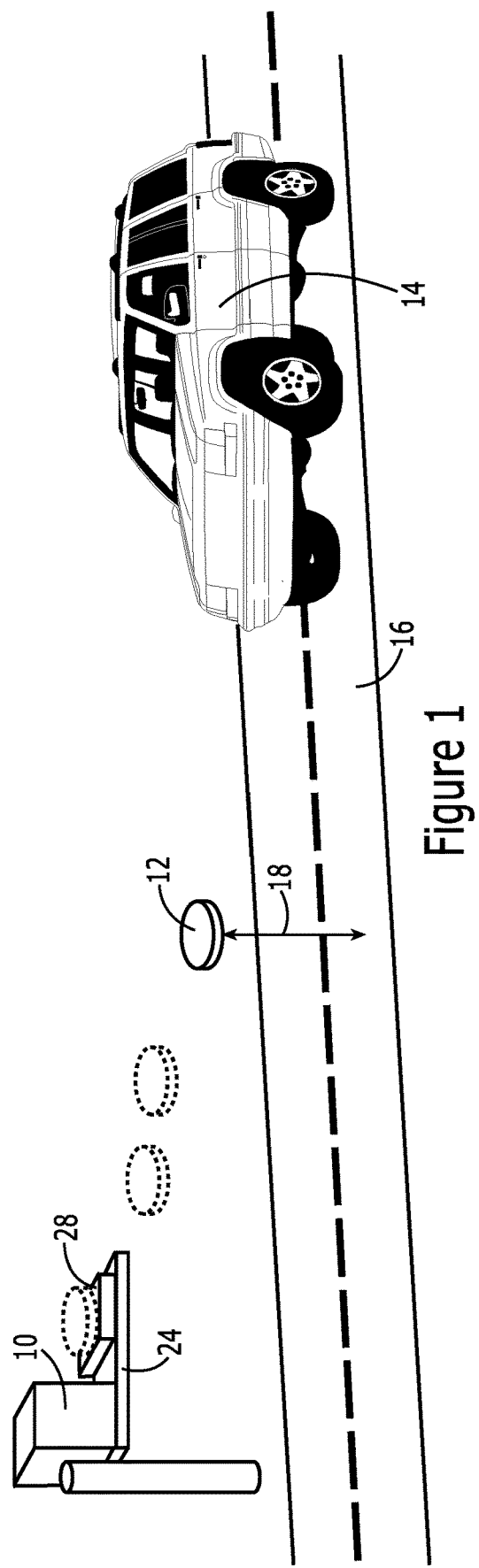
Figure 2:
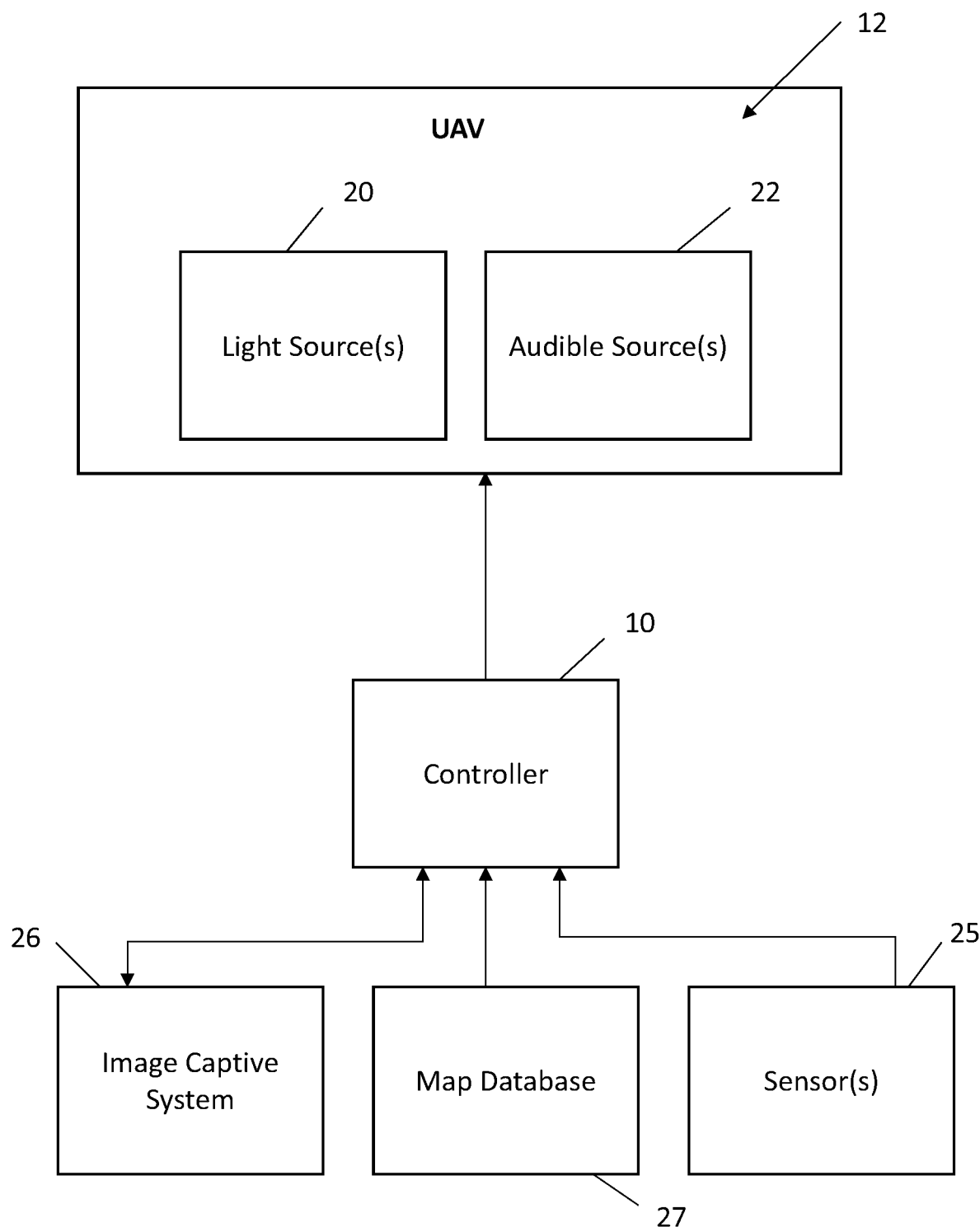
Figure 3:
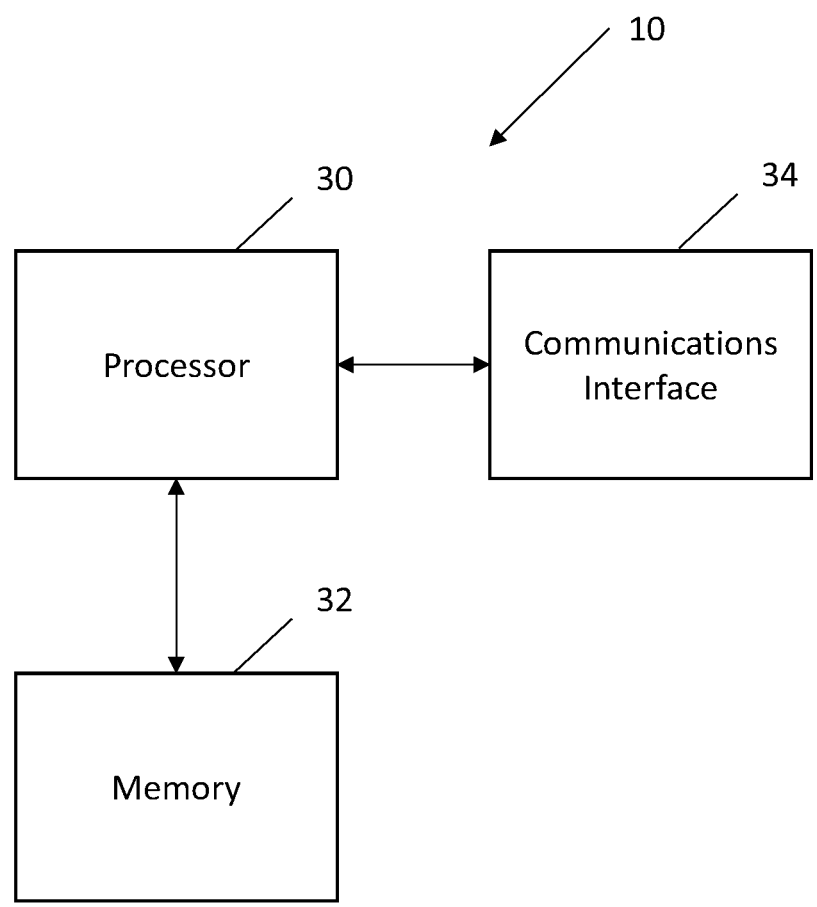
Figure 4:
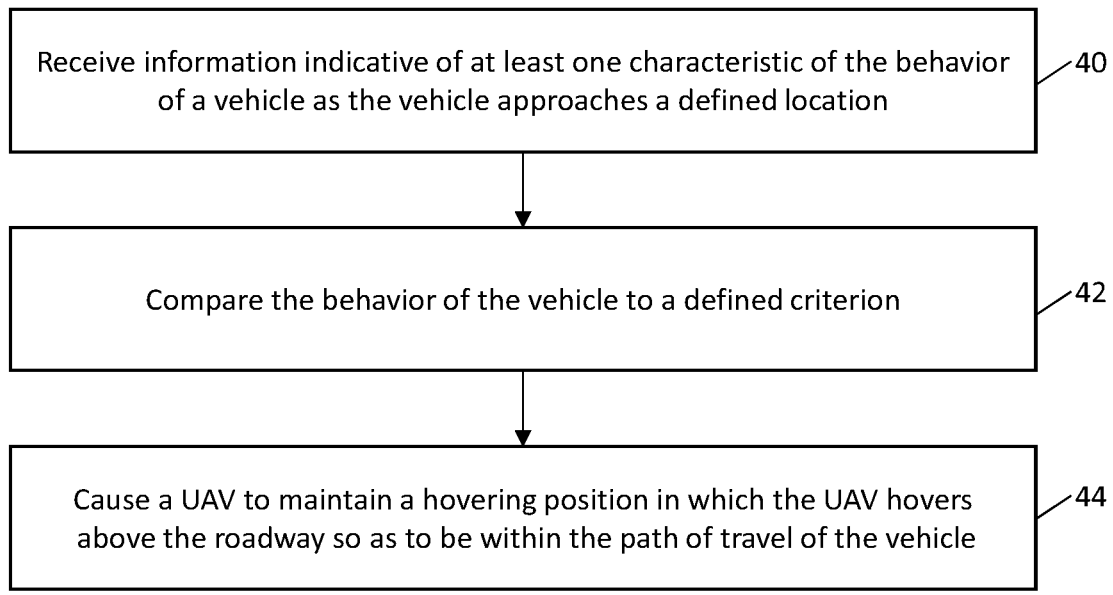
Figure 5:
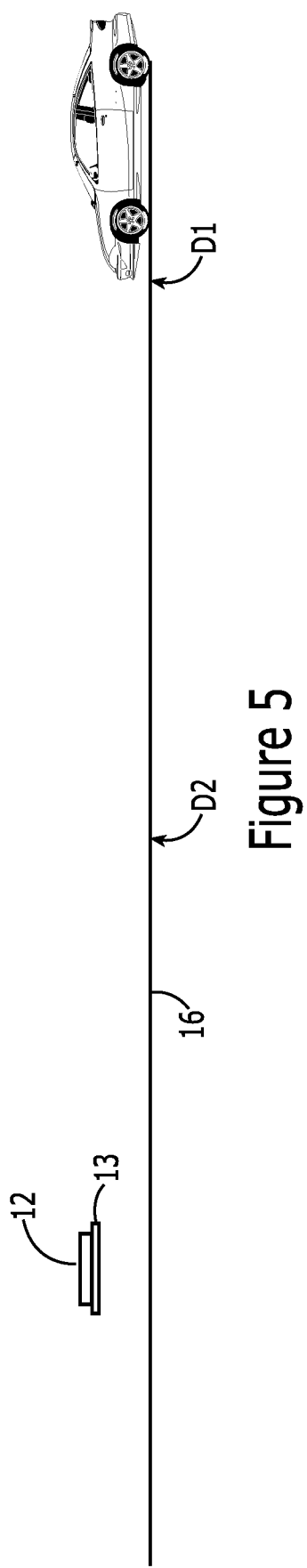
Figure 6:
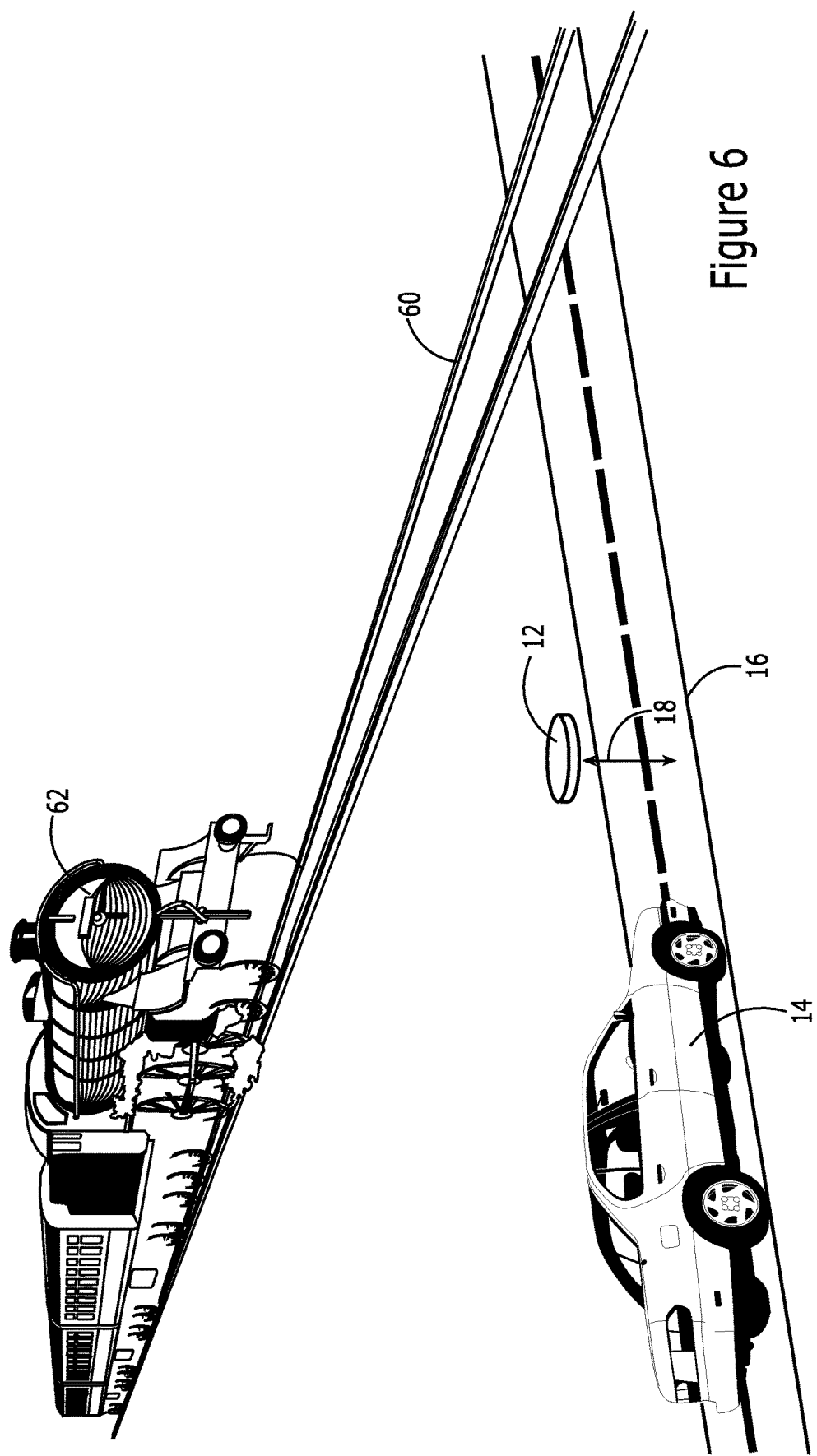
Figure 7:
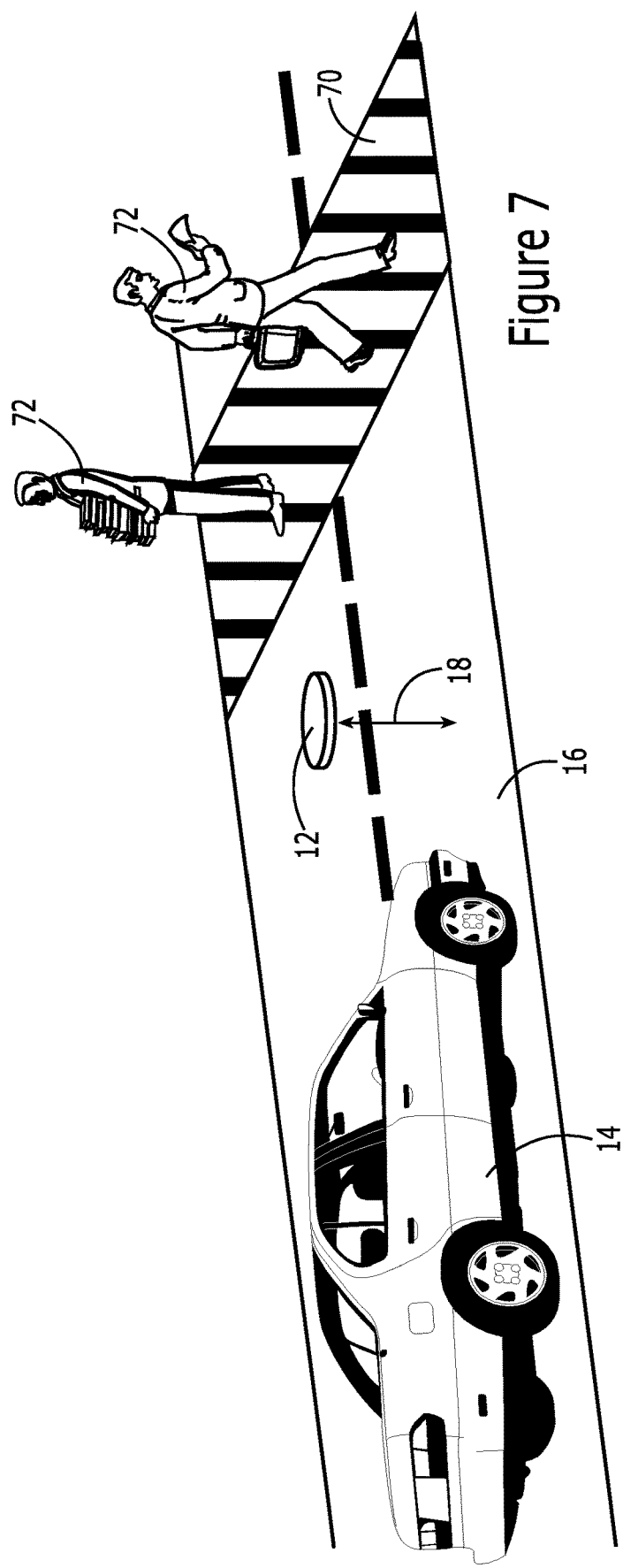
Figure 8:
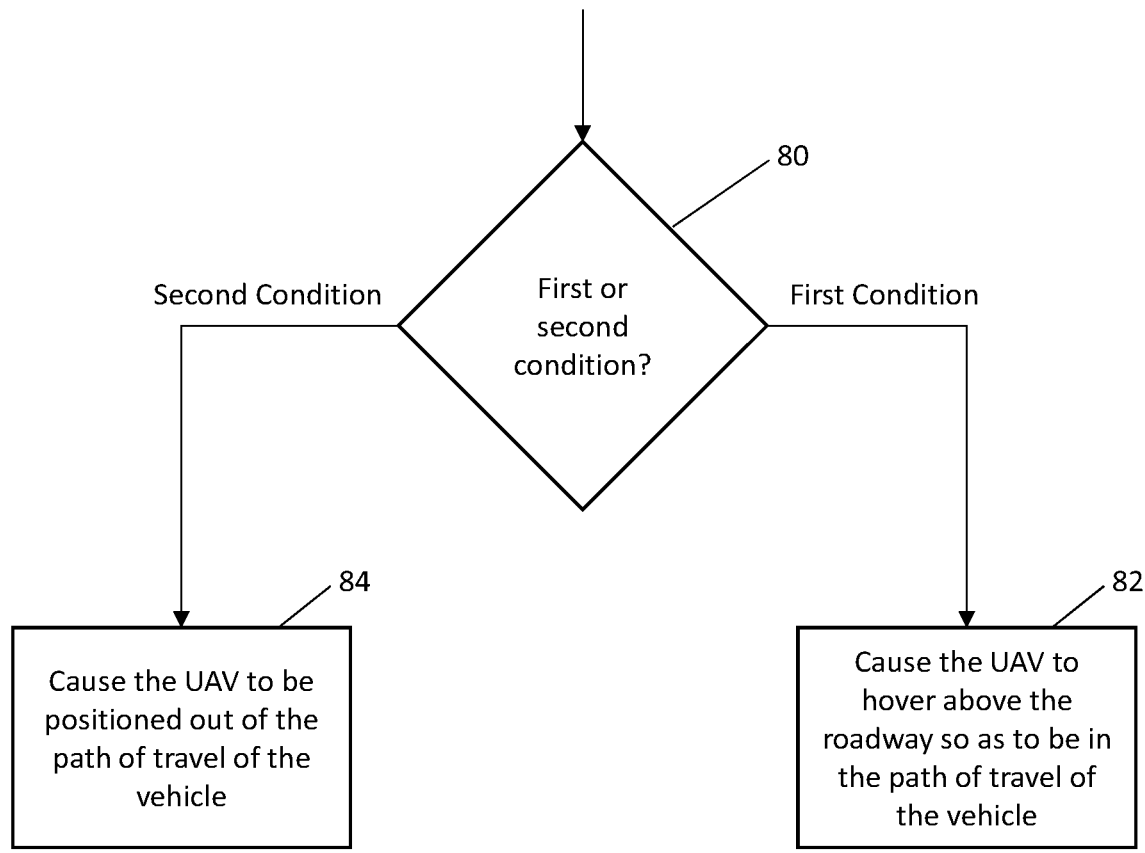

Having thus described the invention in general terms, reference will now be made to the accompanying drawings, which are not necessarily drawn to scale, and wherein:

FIG. 1 is a perspective view of a traffic control system including a controller and an associated unmanned air vehicle (UAV) in accordance with an example embodiment of the present disclosure;

FIG. 2 is a block diagram of a traffic control system in accordance with an example embodiment of the present disclosure;

FIG. 3 is a block diagram of a controller in accordance with an example embodiment of the present disclosure;

FIG. 4 is a flow chart illustrating operations performed, such as by the controller of FIG. 3, in accordance with an example embodiment of the present disclosure;

FIG. 5 illustrates a roadway along which a vehicle is approaching a defined spatial location;

FIG. 6 is a perspective view of a traffic control system and an associated UAV in association with a railroad crossing in accordance with an example embodiment of the present disclosure;

FIG. 7 is a perspective view of a traffic control system and an associated UAV in association with a pedestrian crossing in accordance with an example embodiment to the present disclosure; and FIG. 8 is a flow chart illustrating operations performed, such as by a traffic control system, in accordance with another example embodiment to the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A traffic control system, a controller and an associated method are provided in accordance with an example embodiment in order to utilize an unmanned air vehicle (UAV) in order to direct a vehicle to slow or stop at a defined spatial location along a roadway. For example, the traffic control system, the controller and the associated method may be utilized in order to direct traffic to slow or stop under certain conditions at a railroad crossing or a pedestrian crosswalk. Additionally, or alternatively, the traffic control system, controller and associated method of an example embodiment may be utilized in lieu of a speed bump or other traffic control device intended to slow traffic in order to direct the vehicle to slow at a defined spatial location. By directing the vehicle to slow or stop, the traffic control system, the controller and the associated method of an example embodiment may provide for enhanced safety of pedestrians and, in some instances, the driver of the vehicle itself. Moreover, the traffic control system, the controller and the associated method direct the vehicle to slow at a defined spatial location in lieu of a speed bump or the like in a manner that is less likely to cause vehicular damage of the type that may be incurred by passing over a speed bump at an excessive speed.

A traffic control system on an example embodiment is depicted in FIG. 1 and in the form of a block diagram in FIG. 2. The traffic control system includes a controller 10 that, in turn, is configured to control a UAV 12 so as to cause the UAV to alternately fly into and out of the path of travel of a vehicle 14 dependent upon various predefined conditions. As described below, the controller may be configured to cause the UAV to hover above the roadway 16 (as indicated by the double headed arrow 18) within the path of travel of the vehicle in an instance in which a vehicle is determined to be approaching the defined spatial location, such as in all instances or in only those instances in which the vehicle is determined to be approaching the defined spatial location at a speed that exceeds a defined speed. The presence of the UAV hovering above the roadway within the path of travel of the vehicle is intended to direct the vehicle to slow, either as a result of the reminder provided by the UAV to the driver that the driver should proceed slowly along at least this segment of the roadway or simply to avoid contacting the UAV at any great rate of speed that may, in turn, cause damage to the vehicle. As such, the traffic control system of this example embodiment is configured to cause a vehicle to slow at a defined spatial location without incurring the expense and maintenance associated with the installation and repair of a speed bump and without jostling the driver and any passengers of the vehicle and potentially damaging the vehicle in the manner potentially caused by the vehicle passing over a speed bump, at least at an excessive rate of speed.

The traffic control system may utilize any of the wide variety of UAVs 12, such as drones or other types of controllable flying objects. The UAV of the traffic control system of FIG. 1 is depicted to have a generally cylindrical shape. However, the UAV may have any of a variety of different shapes and sizes. The UAV is, however, advantageously configured so as to be readily visible by the driver of the vehicle 14 approaching the defined spatial location in an instance in which the UAV is hovering above the roadway 16 so as to be within the path of travel of the vehicle. The UAV of an example embodiment includes visible indicia, such as bright coloring and/or one or more reflectors, in order to increase the likelihood that a driver of an approaching vehicle will see the UAV. As described below, the UAV of some example embodiments may also include one or more light sources 20 that are activated, at least in certain circumstances, while the UAV is hovering above the roadway so as to be within the path of the travel of the vehicle in order to further increase the likelihood that the driver of the vehicle will take note of the UAV and slow the vehicle. In some embodiments, the light sources of a UAV may be controlled so as to flash or otherwise be illuminated in a pattern or sequence so as to further increase the likelihood that the driver of the approaching vehicle will see the UAV. The UAV of an example embodiment may also or alternatively include one or more audible sources 22, such as a horn, for emitting audible sounds, at least under certain circumstances, while the UAV is hovering above the roadway so as to be within the path of the travel of the vehicle in order to further increase the likelihood that the driver of an approaching vehicle will take note of the UAV. The audible source may be controlled so as to cause the audible sounds to be emitted in a pattern or sequence in order to further increase the likelihood that the driver of an approaching vehicle will hear and, in turn, see the UAV hovering above the roadway and, as a result, slow the vehicle.

Although a spatial location along a roadway at which a UAV 12 is positioned may be defined in various manners, the traffic control system of an example embodiment includes a map database that includes map data that defines, among other things, the spatial location along the roadway at which a UAV is positioned. The map database 27 is shown in the embodiment of FIG. 2 to be accessible by the controller 10. However, the map database of another example embodiment is embodied by the controller or by the UAV.

Regardless of the manner in which the map database 27 is embodied, the map database that may include node data, road segment data or link data, point of interest (POI) data, traffic data, data defining the spatial location along the roadway at which a UAV 12 is positioned or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 27 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, such as by defining the spatial location along a roadway at which a UAV 12 will be positioned. The navigation-related functions can correspond to vehicle navigation, pedestrian navigation, or other types of navigation.

The map database 27 may be a master geographic database that may be accessed by one or more remote systems, such as the traffic control system. In an alternate embodiments, a client side map database may represent a compiled navigation database that may be used in or by the traffic control system in order to provide navigation and/or map-related functions, as well as to define the spatial location at which a UAV 12 will be positioned. In such a case, the map database can be downloaded or stored by the traffic control system which can then access the map database in a local manner.

As shown in FIGS. 1 and 2, the traffic control system includes a controller 10. The controller may be onboard the UAV 12 or may be physically separate from, but in communication with the UAV, as shown in the embodiment of FIG. 1. In this regard, in an embodiment in which the controller is physically separate from, but in communication with the UAV, the controller may be co-located with the UAV at the defined spatial location. As shown in FIG. 1, for example, the controller may be positioned alongside the roadway 16. Alternatively, the controller may be mounted upon a fixture, such as a light pole, a utility pole, a road sign, a platform 24 or the like. In yet another example embodiment, the controller may be located remote from the defined spatial location, but may remain in communication with the UAV, either directly or indirectly, in order to control the operation of the UAV.

Although the controller 10 may be embodied in a variety of different manners, the controller of an example embodiment is embodied by a computing device, such as a computer. One example of a computing device that may embody the controller is depicted in FIG. 3. As shown in FIG. 3, the controller of this example embodiment includes, as associated with or is otherwise in communication with a processor 30, a memory device 32 and a communication interface 34. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor. Further, the memory device of an example embodiment may include the map database 27.

The processor 30 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 30 may be configured to execute instructions stored in the memory device 32 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The controller 10 of an example embodiment may also optionally include a communication interface 34 that may be any means such as a device or circuitry embodied in either hardware or a combination of hardware and software that is configured to receive and/or transmit data from/to other electronic devices in communication with the apparatus. Additionally or alternatively, the communication interface may be configured to communicate over Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

Referring now to FIG. 4, the operations performed, such as by the controller 10 of FIG. 3, in accordance with an example embodiment are depicted. As shown in block 40, the controller of an example embodiment includes means, such as the communication interface 34, the processor 30 or the like, for receiving information indicative of at least one characteristic of the behavior of a vehicle 14 as the vehicle approaches the defined spatial location. The information received by the controller may be indicative of various characteristics of the behavior of the vehicle. For example, the information may be indicative of the speed of the vehicle. Additionally or alternatively, the information may be indicative of a distance to the vehicle, such as the distance from the defined spatial location to the vehicle. The information indicative of at least one characteristic of the behavior of a vehicle that is received by the controller may be provided by one or more sensors. As shown in FIG. 2, for example, the traffic control system may include or otherwise be in communication with one or more sensors 25, such as radar, light detection and ranging (LIDAR) or imaging sensors, for determining the speed of and/or distance to an approaching vehicle. Additionally or alternatively, the controller may receive the information indicative of various characteristics of the behavior of an approaching vehicle based upon information provided by the approaching vehicle itself or a mobile device onboard the approaching vehicle. For example, the approaching vehicle may include a navigation system and/or a global positioning system (GPS) that provides frequent updates as to the position and, in some embodiments, the speed of the vehicle such that this information may be relayed to the controller. Still further, an occupant of the vehicle may include a mobile device, such as a smart phone, a personal navigation device, a GPS or the like, that similarly provides frequent updates as to the position and, in some embodiments, the speed at which the mobile device and, in turn, the vehicle that is carrying the mobile device is travelling with this information similarly being relayed to the controller.

As shown in block 42 of FIG. 4, the controller 10 also includes means, such as the processor 30 or the like, for comparing, based upon the information that has been received, the behavior of the vehicle 14 to a defined criterion. The controller also includes means, such as the processor or the like, for causing the UAV 12, in response to comparing the behavior of the vehicle to the defined criterion, to maintain a hovering position, an example of which is shown in FIG. 1, in which the UAV hovers above the roadway 16 so as to be within a path of travel of the vehicle on the roadway. See block 44 of FIG. 4. Although the UAV may be caused to hover above the roadway at various positions, the UAV of an example embodiment is caused to hover above the roadway at the defined spatial location and at a height that is in general alignment with the windshield of most vehicles, such as three to five feet above the surface of the roadway. Further, the UAV is caused to hover above the roadway at a position that is generally aligned with the path of travel of the vehicle, such as by hovering at a position that is within a medial portion, e.g., centered within, the lane of the roadway within which the vehicle is travelling. As such, the hovering of the UAV above the roadway within the path of travel of the vehicle is intended to gain the attention of the driver and to encourage the vehicle to slow and, some embodiments, stop, at the defined spatial location.

By way of example, the information received by the controller 10 in one example embodiment is indicative of the speed of the vehicle 14 approaching the defined spatial location. In this example embodiment, the controller, such as the processor 30, is configured to compare the behavior of the vehicle to the defined criterion by determining whether the speed of the vehicle is less than a defined speed. The defined speed may be the posted speed limit for the portion of the roadway 16 along which the vehicle is travelling or some slower speed that is enforced at the defined spatial location. In one example, the defined speed may be 5 miles per hour, 10 miles per hour, 15 miles per hour, 10 km per hour, 20 km per hour or 30 km per hour, or other speeds that are relatively low. In this example embodiment, the controller, such as the processor, is configured to cause the UAV 12 to maintain or move into the hovering position within the path of travel of the vehicle in response to determining that the speed of the vehicle is greater than the defined speed. Thus, in an instance in which an approaching vehicle is determined to be travelling at a speed that considered too fast (or at least greater than the defined speed), the UAV is caused to fly into or to remain in the hovering position above the roadway within the path of travel of the vehicle so as to alert the driver of the vehicle of the need to slow the vehicle. In an example embodiment, the controller also includes means, such as the processor or the like, for causing the UAV to fly out of the path of travel of the vehicle in response to determining that the speed of the vehicle is less than the defined speed. Thus, in an embodiment in which the UAV is always caused to hover above the roadway upon receiving an indication of an approaching vehicle, the controller of this example embodiment may cause the UAV to fly out of the path of travel of the vehicle upon determining that the speed of the vehicle is below the defined speed such that the vehicle is travelling at a sufficiently slow speed at the defined spatial location. Alternatively, the controller may initially determine that the speed of an approaching vehicle exceeds the defined speed and may cause the UAV to either remain at or fly into the hovering position above the roadway and upon subsequently determining that the vehicle has slowed to a speed that is less than the defined speed, may then cause the UAV to fly out of the path of travel of the vehicle.

The controller 10, such as the processor 30, may be configured to cause the UAV 12 to fly out of the path of travel of the vehicle 14 in various manners. For example, the controller, such as the processor, may be configured to cause the UAV to be flown out of the path of travel by flying to a greater altitude such that the vehicle will pass below the UAV. Alternatively, the controller, such as the processor, may be configured to cause the UAV to fly out of the path of travel by flying to either side of the roadway 16 so as to no longer be above the roadway. In this example embodiment, the controller, such as the processor, may be configured to cause the UAV to fly out of the path of travel of the vehicle to a rest position. The rest position may be a position on the ground or on a platform 24 or other fixture alongside the roadway or on the roadway itself. As shown by the dashed line representation of the UAV in FIG. 1, the UAV flies out of the path of travel of the vehicle to a rest position on the platform alongside the roadway. While in the rest position, the UAV is no longer airborne and is, instead, supported in such a manner that the UAV may be at least partially or fully powered down in order to conserve power.

In another example embodiment, the information received by the controller 10 is indicative of a distance to the vehicle 14. In this example embodiment, the controller, such as the processor 30, is configured to compare the behavior of the vehicle to the defined criterion by determining whether the distance to the vehicle is less than a defined distance. In addition, the controller, such as the processor, of this example embodiment is configured to cause the UAV 12 to maintain the hovering position within the path of travel of the vehicle in response to determining that the distance to the vehicle is greater than the defined distance. However, the controller of this example embodiment also includes means, such as the processor or the like, for causing the UAV to fly out of the path of travel of the vehicle in response to determining that the distance to the vehicle is less than the defined distance. Thus, in this example embodiment, when the approaching vehicle is still relatively far from the defined spatial location, the UAV hovers above the roadway 16 within the path of travel of the vehicle in order to alert the driver that the vehicle should be slowed. However, as the vehicle more closely approaches the defined spatial location, the UAV is controlled so as to fly out of the path of travel, such as in the manner described above and, in one embodiment, regardless of the speed of the vehicle, that is, regardless of whether the vehicle has slowed or not.

Although alternative embodiments have been described above in conjunction with information received by the controller 10 relating to either the speed of an approaching vehicle 14 or the distance to an approaching vehicle, the controller 10 of other example embodiments is configured to receive other types of information indicative of other behavior of the approaching vehicle. Additionally, the information that is received and utilized by the controller in order to control the flight of the UAV 12 may include two or more different parameters indicative of the behavior of the vehicle with the two or more different parameters being utilized in combination to control the flight of the UAV. For example, while described above as separate embodiments, the controller of an example embodiment may be configured to receive information indicative of both the speed of an approaching vehicle as well as the distance to the approaching vehicle. In this example embodiment, the controller, such as the processor 30, may be configured to utilize information indicative of both the speed of and the distance to the approaching vehicle in order to determine the manner in which the UAV is to be controlled. For example, a UAV may only be caused to hover above the roadway within the path of travel of an approaching vehicle in an instance in which the distance to the vehicle is greater than the defined distance and the speed of the vehicle is greater than the defined speed. In this example embodiment, the controller may also be configured to cause the UAV to fly out of the path of travel in an instance in which either the distance to the vehicle is less than a defined distance or the speed of the vehicle is less than a defined speed. Thus, the UAV is not automatically caused to hover above the roadway within the path of travel of an approaching vehicle, but, instead, is only caused to hover above the roadway in an instance in which the approaching vehicle is both more than the defined distance from the defined spatial location and is also travelling at a speed greater than the defined speed. Thereafter, if the vehicle slows to less than the defined speed or drives to within the defined distance from the defined spatial location, the UAV may be flown out of the path of travel of the approaching vehicle even if the vehicle remains more than the defined distance from the defined spatial location.

In some example embodiments in which the UAV 12 is caused to fly out of the path of travel of an approaching vehicle 14 and to return to a rest position, the UAV may remain in the rest position until another approaching vehicle is detected. In this regard, the controller 10, such as the processor 30, is configured to analyze the information that is received in order to determine when another vehicle is approaching the defined spatial location, such as a vehicle being detected to be within a predetermined first distance of the defined spatial location. The controller or this example embodiment includes means, such as the processor of the like, for causing the UAV to fly from the rest position to the hovering position in response to the indication that the vehicle is approaching the defined spatial location along the roadway 16. With reference to FIG. 5, for example, the receipt of information by the controller indicative of the vehicle being with the predetermined first distance (designated $D_1$) of the defined spatial location causes the UAV to be flown into the hovering position. In the embodiment in which the controller controls the operation of the UAV based upon the distance to the vehicle, without consideration of the speed of the vehicle, the controller may be configured to cause the fly out of the path of travel of the vehicle upon determining that the vehicle is within the defined distance (designated $D_2$) of the defined spatial location. As shown, the defined distance $D_2$ is smaller than, such as much smaller than, the predetermined first distance $D_1$.

The traffic control system, such as the controller 10, may be configured to cause the UAV 12 to operate at the defined spatial location, such as described above, in a continuous manner. However, in some embodiments, the control system, such as the processor, is configured to control the operation of the UAV so as to direct a vehicle 14 to slow at the defined spatial location only during a defined time period, such as only during school hours, only during hours in which children may be at play, only during time periods in which traffic volumes are heavy or the like. In this example embodiment, the controller, such as the processor 30, is also configured to compare not only the behavior of the vehicle to the defined criterion in order to determine whether the UAV should fly in a hovering position above the roadway, but also to determine whether the current time is within a defined time period during which the traffic control system is to be operational. In an instance in which the current time is within the defined time period, the controller may cause the UAV to be positioned as described above, while in an instance in which the current time is outside of or not within the defined time period, the UAV may remain in the rest position as the traffic control system is not intended to be operational. By way of example in which the information received by the controller is indicative of the speed of the vehicle, the controller, such as the processor, of an example embodiment is configured to determine not only whether the speed of the vehicle is less than the defined speed, but also to determine whether the speed of the vehicle is less than the defined speed during a defined time period. In this embodiment, the controller, such as the processor, is also configured to cause the UAV to maintain the hovering position within the path of travel of the vehicle in response to determining both that the speed of the vehicle is greater than the defined speed and that the current time is within the defined time period.

As noted above, when the UAV 12 is hovering above the roadway 16 within the path of travel of the vehicle 14, the controller 10, such as the processor 30, may be configured to cause one or more the light sources 20 and/or one or more the audible sources 22 onboard the UAV to be actuated. As such, the likelihood that the driver of the approaching vehicle will take note of the UAV and slow the vehicle may be increased. The one or more light sources and the one or more audible sources may be actuated at all times while the UAV is hovering above the roadway within the path of travel of the vehicle. However, the controller, such as the processor, of an example embodiment may alternatively be configured so as to only actuate the one or more light sources and/or the one or more audible sources upon the satisfaction of an additional criterion. For example, the one or more light sources and/or the one or more audible sources may only be actuated by the controller of an example embodiment in an instance in which an approaching vehicle is both within a predefined distance threshold of the defined spatial location and has a speed that is greater than a predefined speed threshold (which may, in some embodiments, equal the defined speed). Thus, the UAV of this example embodiment may be controlled so as to initially hover above the roadway within the path of travel of the vehicle and to provide the vehicle with an opportunity to be slowed. However, if the vehicle continues to approach the defined spatial location at a speed greater than the predefined speed threshold, one or more light sources and/or one or more audible sources onboard the UAV may be actuated in order to increase the likelihood that the driver will take note of the UAV and slow the vehicle prior to reaching the defined spatial location.

Although the traffic control system has been described above with the controller 10 being configured to cause the UAV 12 to fly out of the path of travel of the vehicle 14, such as in response to determining that the speed of the vehicle is less than a defined speed and/or in response to determining that the distance to the vehicle is less than the defined distance, the traffic control system of an example embodiment may be configured to maintain the UAV within the hovering position above the roadway 16 within the path of travel of the vehicle in an instance in which the conditions that are required to cause the UAV to be flown out of the path of travel of the vehicle are not satisfied even as the vehicle continues to approach the defined spatial location and, in some instances, comes into contact with the UAV. For example, in an embodiment in which the controller is configured to cause a UAV to fly out of the path of travel of the vehicle in response to determining that the speed of the vehicle is less than the defined speed, the controller, such as the processor 30, of an example embodiment is configured to cause the UAV to maintain the hovering position within the path of travel of the vehicle in an instance in which the speed of the vehicle remains greater than the defined speed even as the vehicle more closely approaches the defined spatial location, such as an instance in which the distance to the vehicle is less than the defined distance. In this example embodiment, the controller, such as the processor, may be configured to cause the UAV to remain in a hovering position above the roadway within the path of travel of the vehicle even as the vehicle reaches the defined spatial location if the vehicle has not satisfied the defined criterion, such as by reducing the speed of the vehicle to less than the defined speed.

In this instance, the UAV 12 may contact the vehicle 14, such as the windshield of the vehicle, thereby providing further incentive for the driver of the vehicle to slow the vehicle at least upon reaching the defined location and contacting the UAV. In this example embodiment, the UAV may include a bumper 13 or outer covering formed, for example, of an elastomeric material, such as rubber, and configured to physically contact the vehicle. In some embodiments, the elastomeric material may be configured to create a mark on the vehicle, such as the windshield of the vehicle, in response to the physical contact with the vehicle. Although the mark may generally be readily removed by the owner of the vehicle, such as by washing the windshield, the potential creation of such a mark on a vehicle may provide additional motivation for the driver of the vehicle to slow the vehicle in subsequent instances in which the vehicle is approaching the defined spatial location. Furthermore, the controller 10 of an example embodiment may be configured to cause an audible source 22 onboard the UAV to emit a predefined sound effect upon contact with the vehicle. For example, the predefined sound effect may replicate the sound of glass breaking in order to further motivate the driver of the vehicle to slow the vehicle.

A traffic control system of an example embodiment also includes an image capture system 26, such as a camera or other image sensor. The image capture system may be onboard the UAV 12 or may otherwise be disposed at the defined spatial location, such as upon the platform 24. In this example embodiment, the controller 10 includes means, such as the processor 30 or the like, for causing an image of the vehicle 14 to be captured, such as by causing the image capture system to capture an image of the approaching vehicle. Although images may be captured of all approaching vehicles, the controller of an example embodiment is configured to cause the image capture system to only capture images of certain select vehicles, such as vehicles that do not satisfy the defined criterion. In this example embodiment and in an instance in which the information received by the controller is indicative of the speed of the vehicle, the controller is configured to cause an image to be captured, such as by the image capture module, by causing an image to be captured in response to determining that the speed of the vehicle exceeds a determined threshold, such as the defined speed. For example, in an instance in which the vehicle does not slow to a speed that is at or below the defined speed at the defined spatial location, the image of the vehicle, along with other information associated with the vehicle, such as the time of day at which the image was captured, the speed at which the vehicle was travelling, the defined spatial location or the like, may be provided to law enforcement in order to permit the driver of the vehicle to be ticketed for excessive speed. In this regard, the image of the vehicle that is captured should include at least indicia identifying the vehicle, such as the license plate of the vehicle.

The UAV 12 may receive power in various manners. For example, the UAV may be solar powered and, as a result, may receive power from the sunlight incident upon the UAV. Alternatively, the traffic control system may include a recharging station 28, such as shown in FIG. 1. In an example embodiment, the recharging station is located at or otherwise defines the rest position of the UAV such that as the UAV returns to the rest position, the battery of the UAV may be recharged by the recharging station. As shown in FIG. 1, the recharging station may be located alongside the roadway 16, such as on the ground or on light pole, utility pole, a road sign, a dedicated platform 24 or the like. While the traffic control system of the example embodiment depicted in FIG. 1 includes a single UAV for alternately hovering above the roadway within the path of travel of an approaching vehicle 14 and then returning to the rest position, the traffic control system of another example embodiment may include two or more UAVs that are configured to alternately be operational and recharging. Thus, a first UAV may be operational in order to controllably hover above the roadway as described above, while the second UAV is recharging. On a predefined schedule or upon detecting a low power condition of the first UAV, the roles of the first and second UAVs may be reversed such that the first UAV returns to the rest position and is recharged, while the second UAV becomes operational.

In yet another example embodiment, the UAV 12 may be connected to a power supply via a wired connection, such as an electrical tether. For example, the electrical tether may extend from electrical power lines, such as the electrical power lines feeding a pole-mounted light or suspended by utility poles. In this example embodiment, the electrical tether has a sufficient length such that the UAV may be caused to hover above the roadway within the path of travel of an approaching vehicle 14 and to also fly out of the path of travel of the vehicle, such as to a rest position. In yet another example embodiment, the battery of a UAV may be configured to be inductively charged, such as from power lines extending alongside the roadway. In this example embodiment, the rest position of the UAV may be located proximate the electrical power lines, such as by being upon a platform supported by a utility pole that carries the electrical power lines in order to facilitate inductive charging of the battery of the UAV.

The traffic control system may be configured to control traffic in a number of different types of spatial locations, such as a spatial location that might otherwise have a speed bump, as well as at a railroad crossing or at a pedestrian crosswalk. As shown in FIG. 6, the traffic control system of an example embodiment may be configured to cause a UAV 12 to hover above the roadway 16 so as to be within the path of travel of a vehicle 14 at a defined spatial location that coincides with a railroad crossing 60. Thus, the hovering UAV may alert the driver of the approaching vehicle of the railroad crossing and cause the driver to stop prior to reaching the railroad crossing. Similarly, FIG. 7 depicts an embodiment in which a UAV is configured to hover above the roadway so as to be within the path of travel of the vehicle approaching a pedestrian crosswalk 70. Thus, the driver of the vehicle is alerted by the UAV as to the pedestrian crosswalk and slows or stops the vehicle in advance of the pedestrian crosswalk.

In these example embodiments, the traffic control system, such as the controller 10, is configured to control operation of the UAV 12 at the defined spatial location along the roadway 16 differently in response to first and second mutually exclusive conditions along the roadway. Thus, the controller of this example embodiment includes means, such as the processor 30 or the like, for determining whether the first or the second mutually exclusive conditions exist as shown in decision block 80 of FIG. 8. In response to the first condition, the controller of this example embodiment includes means, such as the processor or the like, for causing the UAV to hover above the roadway so as to be within a path of travel of a vehicle 14 on the roadway as shown in block 82 of FIG. 8. Alternatively, in response to a second condition, the controller includes means, such as the processor or the like, for causing the UAV to be positioned out of the path of travel of the vehicle on the roadway. See block 84 of FIG. 8. Thus, the UAV is configured to remain at the defined spatial location and to be controlled by the controller so as to alternately respond to the first and second conditions along the roadway.

As shown in FIG. 6 in which the defined spatial location coincides with a railroad crossing 60, the first condition is associated with a train 62 crossing the roadway 16, while the second condition is indicative of an absence of a train from the roadway. Thus, the hovering of the UAV above the roadway within the path of travel of an approaching vehicle as shown in FIG. 6 will alert the driver of the vehicle 14 to stop in an instance in which a train is crossing the roadway. However, the controller of this example embodiment is also configured to cause the UAV to be positioned out of the path of travel when no train is crossing the roadway. The controller may receive information indicating that a train is crossing the roadway in various manners. For example, the controller may receive information from the train itself indicative of the proximity of the train. Alternatively, a railroad control system may provide the controller with information indicative of the approaching train. In yet another embodiment, the controller may receive information from or triggered by a switch actuated by the train at a location along the railroad tracks upstream of the railroad crossing.

In another embodiment depicted in FIG. 7 in which the defined spatial location coincides with a pedestrian crosswalk 70, the first condition is associated with one or more people 72 being in the crosswalk across the roadway 16, while the second condition is indicative of the absence of people within the crosswalk. Thus, when one or more people are in the crosswalk, the controller 10 of this example embodiment is configured to cause the UAV 12 to hover above the roadway within the path of travel of an approaching vehicle 14 so as to alert the driver of the vehicle as to one or more people being within the crosswalk such that the vehicle may be stopped. However, when people are not within the crosswalk, the controller of this example embodiment is configured to cause the UAV to be positioned out of the path of travel of the vehicle so as to permit the vehicle to more freely move along the roadway. The controller may receive information indicating that a person is in the crosswalk in various manners. For example, the controller may receive information from a crosswalk controller that includes a button or switch actuated by the person prior to entering the crosswalk. Alternatively, the controller may be configured to receive information from which one or more people within the crosswalk may be detected, such as by receiving an image of the crosswalk from which one or more people within the crosswalk may be identified based upon image analysis or by receiving information transmitted by mobile devices, such as smartphones, carried by the one or more people from which the location of the one or more people may be determined including a determination as to whether the people are in the crosswalk.

In instances in which the defined spatial location corresponds to a railroad crossing 60 or a pedestrian crosswalk 70, the traffic control system, such as the controller 10, may be configured to cause a UAV 12 to hover above the roadway 16 so as to be within the path of travel of the vehicle 14 on the roadway so long as the first condition is satisfied, such as so long as a train 62 is crossing the roadway or one or more people 72 are within the crosswalk. As such, the traffic control system, such as the controller, of this example embodiment is not configured to cause the UAV to fly out of the path of travel of the vehicle based upon the behavior of the vehicle, such as based upon the vehicle slowing to a speed below a desired speed or being at a location within a defined distance of the defined spatial location and, instead, is dependent upon external factors, such as the presence of a train or pedestrians. Thus, in an instance in which a vehicle does not stop at the defined spatial location, such as in an instance in which a vehicle attempts to drive through the defined spatial location prior to the arrival of an approaching train, the UAV may be caused to remain in the hovering position above the roadway and within the path of travel of the vehicle so as to contact the vehicle, such as the windshield of the vehicle, as described above and to provide further incentive for the driver of the vehicle to stop the vehicle until the train has crossed the roadway or the pedestrians are out of the crosswalk.

In another embodiment and as described above in conjunction with a defined spatial location that coincides with a location at which a speed bump may otherwise have been located, the first condition may be associated with the vehicle 12 approaching the defined spatial location along the roadway 14, while the second condition may be indicative of the absence of a vehicle from the proximity of the defined spatial location. As also described above, the UAV 12 may be controlled by the controller 10 in this embodiment not only based upon whether a vehicle is approaching the defined location or not, but based upon the behavior of the vehicle, such as the speed of the approaching vehicle. In this regard, the first and second conditions of an example embodiment may be associated with the vehicle approaching the defined spatial location along the roadway at a speed that is greater than or less than a defined speed, respectively.

As described above, a traffic control system, a controller 10 and an associated method are provided in accordance with an example embodiment in order to direct a vehicle 14 to slow or, in some instances, stop at a defined spatial location along the roadway 16. The traffic control system, the controller and the associated method provide for traffic control in a manner that may increase driver adherence to the desired vehicle behavior and, as a result, may correspondingly provide increased safety for both pedestrians and drivers. Moreover, relative to speed bumps, a controller and an associated method of an example embodiment may not only direct the vehicle to slow at the defined spatial location, but may do so in a manner that avoids jostling the driver and any passengers as may occur when driving over a speed bump, while also diminishing the likelihood that the vehicle will be damaged by driving over the speed bump, such as at an excessive rate of speed. Furthermore, relative to speed bumps, a controller and an associated method of an example embodiment may direct vehicles to slow at a defined spatial location in a more cost-efficient manner.

FIGS. 4 and 8 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 32 of an apparatus employing an embodiment of the present invention and executed by a processor 30 of the controller 10. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A controller configured to direct a vehicle to slow at a defined spatial location along a roadway, wherein the controller comprises at least one processor and memory including computer program code, the memory and the computer program code configured to, with the at least one processor, cause the controller to perform at least the following:

receiving information indicative of at least one characteristic of a behavior of the vehicle as the vehicle approaches the defined spatial location, wherein the information is indicative of at least one of a speed of the vehicle or a distance to the vehicle from the defined spatial location;

based on the information, comparing the behavior of the vehicle to a defined criterion, wherein the defined criterion comprises at least one of a speed limit associated with the defined spatial location or a defined distance to the vehicle from the defined spatial location; and in response to comparing the behavior of the vehicle to the defined criterion, causing an unmanned air vehicle (UAV) to maintain a hovering position in which the UAV hovers above the roadway at the defined spatial location so as to be within the path of travel of the vehicle on the roadway.

2. A controller according to claim 1, wherein in an instance in which the information is indicative of the speed of the vehicle, the controller is configured to compare the behavior of the vehicle to the defined criterion by determining whether the speed of the vehicle is less than the speed limit associated with the defined spatial location, wherein the controller is configured to cause the UAV to maintain the hovering position by causing the UAV to maintain the hovering position within the path of travel of the vehicle in response to determining that the speed of the vehicle is greater than the speed limit, and wherein the controller is further configured to cause the UAV to fly out of the path of travel of the vehicle in response to determining that that the speed of the vehicle is less than the speed limit.

3. A controller according to claim 1, wherein in an instance in which the information is indicative of the distance to the vehicle from the defined spatial location, the controller is configured to compare the behavior of the vehicle to the defined criterion by determining whether the distance to the vehicle from the defined spatial location is less than the defined distance, wherein the controller is configured to cause the UAV to maintain the hovering position by causing the UAV to maintain the hovering position within the path of travel of the vehicle in response to determining that the distance to the vehicle from the defined spatial location is greater than the defined distance, and wherein the controller is further configured to cause the UAV to fly out of the path of travel of the vehicle in response to determining that that the distance to the vehicle from the defined spatial location is less than the defined distance.

4. A controller according to claim 1 wherein the memory and the computer program code are configured to, with the at least one processor, cause the controller to cause an image of the vehicle to be captured.

5. A controller according to claim 4 wherein the information is indicative of the speed of the vehicle, wherein the controller is configured to cause the image to be captured by causing the image to be captured in response to determining that the speed of the vehicle exceeds a determined threshold.

6. A controller according to claim 1 wherein the memory and the computer program code are further configured to, with the at least one processor, cause the controller to cause the UAV to fly from a rest position to the hovering position in response to an indication that the vehicle is approaching the defined spatial location along the roadway.

7. A controller according to claim 6 wherein the memory and the computer program code are further configured to, with the at least one processor, cause the controller to cause the UAV to fly out of the path of travel of the vehicle and to return to the rest position in response to comparing the behavior of the vehicle to the defined criterion.

8. A method for directing a vehicle to slow at a defined spatial location along a roadway, wherein the method comprises:
    receiving information indicative of at least one characteristic of a behavior of the vehicle as the vehicle approaches the defined spatial location, wherein the information is indicative of at least one of a speed of the vehicle or a distance to the vehicle from the defined spatial location;
    based on the information, comparing the behavior of the vehicle to a defined criterion, wherein the defined criterion comprises at least one of a speed limit associated with the defined spatial location or a defined distance to the vehicle from the defined spatial location; and
    in response to comparing the behavior of the vehicle to the defined criterion, causing an unmanned air vehicle (UAV) to maintain a hovering position in which the UAV hovers above the roadway at the defined spatial location so as to be within a path of travel of the vehicle on the roadway.

9. A method according to claim 8 wherein in an instance in which the information is indicative of the speed of the vehicle, comparing the behavior of the vehicle to the defined criterion comprises determining whether the speed of the vehicle is less than the speed limit associated with the defined spatial location, wherein causing the UAV to maintain the hovering position comprises causing the UAV to maintain the hovering position within the path of travel of the vehicle in response to determining that the speed of the vehicle is greater than the speed limit, and wherein the method further comprises causing the UAV to fly out of the path of travel of the vehicle in response to determining that that the speed of the vehicle is less than the speed limit.

10. A method according to claim 9 wherein determining whether the speed of the vehicle is less than the speed limit comprises determining whether the speed of the vehicle is less than the speed limit during a defined time period, and wherein causing the UAV to maintain the hovering position within the path of travel of the vehicle comprises causing the UAV to maintain the hovering position within the path of travel of the vehicle in response to determining that the speed of the vehicle is greater than the speed limit within the defined time period.

11. A method according to claim 8 wherein in an instance in which the information is indicative of the distance to the vehicle from the defined spatial location, comparing the behavior of the vehicle to the defined criterion by determining whether the distance to the vehicle from the defined spatial location is less than the defined distance, wherein causing the UAV to maintain the hovering position comprises causing the UAV to maintain the hovering position within the path of travel of the vehicle in response to determining that the distance to the vehicle from the defined spatial location is greater than the defined distance, and wherein the method further comprises causing the UAV to fly out of the path of travel of the vehicle in response to determining that that the distance to the vehicle from the defined spatial location is less than the defined distance.

12. A method according to claim 8 further comprising causing an image of the vehicle to be captured in response to determining that the speed of the vehicle exceeds a determined threshold.

13. A method according to claim 8 further comprising causing the UAV to fly from a rest position to the hovering position in response to an indication that the vehicle is approaching the defined spatial location along the roadway.

14. A method according to claim 13 further comprising recharging the UAV while the UAV is in the rest position.

15. A traffic control system comprising:
    a controller configured to control operation of an unmanned air vehicle (UAV) at a defined spatial location along a roadway differently in response to first and second mutually exclusive conditions along the roadway, wherein the controller is configured, in response to the first condition, to cause the UAV to hover above the roadway at the defined spatial location so as to be within a path of travel of a vehicle on the roadway, and wherein the controller is configured, in response to the second condition, to cause the UAV to be positioned out of the path of travel of the vehicle on the roadway, wherein the UAV is configured to remain at the defined spatial location and to be controlled by the controller so as to alternately respond to the first and second conditions along the roadway, and wherein the UAV comprises a bumper configured to physically contact the vehicle.

16. A traffic control system according to claim 15 wherein the first condition is associated with a train crossing the roadway, and wherein the second condition is indicative of an absence of the train from the roadway.

17. A traffic control system according to claim 15 wherein the first condition is associated with one or more people in a crosswalk across the roadway, and wherein the second condition is indicative of an absence of people from the crosswalk.

18. A traffic control system according to claim 15 wherein the first condition is associated with the vehicle approaching the defined spatial location along the roadway, and wherein the second condition is indicative of an absence of the vehicle from a proximity of the defined spatial location.

19. A traffic control system according to claim 15 wherein the first condition is associated with the vehicle approaching the defined spatial location along the roadway at a speed that is greater than a defined speed and wherein the second condition is associated with the vehicle approaching the defined spatial location along the roadway at a speed that is less than the defined speed.

20. A traffic control system according to claim 15 wherein the bumper comprises an elastomeric material.

21. A traffic control system according to claim 15 further comprising an image capture system configured to capture an image of the vehicle in response to a determination that a speed of the vehicle exceeds a determined threshold.

22. A traffic control system according to claim 15 further comprising one or more sensors configured to detect at least one characteristic of a behavior of the vehicle as the vehicle approaches the defined spatial location along the roadway, wherein the first and second conditions are based upon the at least one characteristic.

* * * * *